United States Patent [19]

Ohnmacht et al.

[11] Patent Number: 4,956,545

[45] Date of Patent: Sep. 11, 1990

[54] HEATER WITH TAP

[75] Inventors: Helmut Ohnmacht, Kandel; Karl-Heinz Nauerth, Erlenbach; Klaus Meywald, Kandel, all of Fed. Rep. of Germany

[73] Assignee: Fritz Eichenauer GmbH & Co. KG, Kandel, Fed. Rep. of Germany

[21] Appl. No.: 153,917

[22] Filed: Feb. 9, 1988

[30] Foreign Application Priority Data

Feb. 10, 1987 [DE] Fed. Rep. of Germany ... 8701993[U]

[51] Int. Cl.$^5$ .......................... H05B 3/02; F24H 3/04
[52] U.S. Cl. ..................................... 219/541; 219/375
[58] Field of Search ............... 219/541, 364, 370, 374, 219/375, 381

[56] References Cited

U.S. PATENT DOCUMENTS

| 4,066,865 | 1/1978 | Godel et al. | 219/370 |
| 4,075,459 | 2/1978 | Lieber | 219/541 |
| 4,122,329 | 10/1978 | Godel | 219/541 |
| 4,191,880 | 3/1980 | Meywald et al. | 219/541 |
| 4,341,946 | 7/1982 | Ohnmacht et al. | 219/370 |
| 4,687,906 | 8/1987 | Fujishima et al. | 219/370 |
| 4,794,225 | 12/1988 | Maese | 219/370 |
| 4,794,227 | 12/1988 | Antoniazzi et al. | 219/370 |

FOREIGN PATENT DOCUMENTS

| 245757 | 11/1987 | European Pat. Off. | 219/375 |
| 54-14033 | 2/1979 | Japan | 219/370 |
| 136962 | 10/1979 | Japan | 219/370 |

*Primary Examiner*—A. D. Pellinen
*Assistant Examiner*—Geoffrey S. Evans
*Attorney, Agent, or Firm*—Antonelli, Terry, Stout & Kraus

[57] ABSTRACT

An electric heater with insulating carrying parts and heating conductors carried by the carrying parts and with at least one tap for tapping a voltage reduced compared with the voltage at the heating conductor. The carrying parts have slots through which pass feet of a tap and through which the tap is fixed to with a carrying part, the length of the slots being greater than a width of the feet of the tap.

9 Claims, 1 Drawing Sheet

HEATER WITH TAP

BACKGROUND OF THE INVENTION

The invention relates to an electric heater with insulating carrying parts and heating conductors carried by the latter and with at least one tap for tapping a voltage lower than the voltage applied to the heating conductor, e.g. for a fan motor or the like.

The invention particularly relates to a heater in which the heating conductor between contact points with the carrying parts extends freely and spaced therefrom and within the area surrounded by the heating conductor the tap is fixed to the carrying part.

Taps on such heaters are used for tapping a voltage reduced compared with the mains voltage at the complete heater, e.g. for a fan motor or the like, which may only be supplied with a lower voltage. Heaters with such taps are in particular known from German Patent No. 2,722,213.

It is apparent from what has been stated hereinbefore that the precise tapping point of the tap on the heating conductor must be fixed for a specific operating member, such as a fan motor, but can differ in the case of different fan motors if they are to be supplied with different voltages. It frequently occurs that the further processor who has to fit such a heater in an electrical appliance, such as e.g. a warm air appliance or hair dryer, when using the same heater wishes to install different operational components, such as fan motors or changes occur to the motor over a period of time. The tapping point can also change as a function of the heating conductor wire used, because the voltage drop is dependent on the material and thickness. Moreover, for a given carrier, the winding manner can differ, in that different steepnesses are used for example leaving free individual wire reception notches or using more than one of wound wires.

Previously the taps were fixed to a particular point of the carrying part by using rivets or lugs. Admittedly, after winding the heating conductor, the tap could be lugfitted to the carrier. However, from the outset it was necessary to provide a punched hole for receiving the lug, so that the tap location was precisely predetermined. Complicated modifications were necessary on changing the point. It was not possible to keep stocks because, in the case of heaters with a fixed position of the tap, when it was necessary to change the position, the corresponding heaters would no longer be usable. has also been proposed to mount clamping tap elements on the edges of the carrying parts engaged round by the heating conductor turns. Such a construction is only possible with heaters constructed in a special radiator-like manner, in which additional carrying and insulting plates are provided outside the area given by the turns and to which the tap cables can be passed, fixed thereto and guided along the same. In addition, the meander-like guided heating conductors must have meander turns engaging over the carrying parts over a considerable length and with limited thickness, whereby said meander turns have a correspondingly large depth with limited spacing between the two legs. This can possibly lead to different problems, particularly the use of specific instead of random carrier types and materials. The taps can also only be fixed in snapping or clamping manner, i.e. not suitable for all uses and applications, although the known construction is highly suitable for certain purposes.

It is also known to provide on the outside of the casing of a heating conductor carrier in the form of a hollow cylinder, which outer casing carries radially arranged insulating plates and over whose outer edges are guided the heating conductor wire, grooves through sidewalls extending parallel from the cylinder casing and into which can be inserted a rail having teeth on its longitudinal sides, the downwardly bent flange of the rail being constructed as a tap. The rail is made from conductive material. Although this construction makes it possible to subsequently fix tap point, this is not in random form and is also complicated. Thus, to ensure that there is no projection over the heater, the rail end remote from the tap may have to be cut off. Moreover, the construction of the hollow cylinder and tap element is complicated and the latter involves considerable material expenditure. A construction including a groove is not even possible in the case of inexpensive planar heating conductor carriers made from clip material and the like.

Thus, the aim underlying the invention is to provide a heater which can be stocked and can be easily and inexpensively adapted in accordance with different operating parts, e.g. fan motors to be used therewith. According to the invention, in the case of an electric heater with insulating carrying parts and heating conductors carried by the latter and with at least one tap for tapping a voltage reduced compared with the voltage at the heating conductor, e.g. for a fan motor or the like, the carrying parts have slots through which pass the feet of a tap and through which the latter is fixed to the carrying part, with the length of the slots being greater than the width of the feet of the tap. As a result of the inventive construction it is possible for the tap to be moved along the slots within the carrying parts and consequently it is possible to modify the position of the tap relative to the turns and therefore the voltage drop along the turns. Thus, different voltages can be tapped on the heating conductor as a function of the tap position in the slot. Therefore the tapped voltage can be adapted to the operating part, such as a fan motor.

The invention makes it possible to use a punching tool for punching out carrier plates, which can then be provided for the different aforementioned use possibilities, in which in particular the tap is subsequently used as a function of different needs and is fixed at different points, so that it can act on the desired one of several turns.

According to a preferred development of the invention two feet which are bent towards one another pass through two parallel slots, so that the tap is securely held on the carrying part. The slots are regularly parallel to the heater axis in the case of heaters with a substantially cylindrical outer contour. The same orientation can be chosen for heaters with a conical contour. In this case, a connecting portion of the tap from the foot and fixing area thereof on the carrying part to the tap area to be pressed with the heating conductor, said area generally being constructed with an open, U-shaped tap sleeve, is so chosen that it can cover the maximum spacing between carrying part and heating conductor. If a displacement is necessary in areas where, due to the conical contour, the heating conductor comes close to the carrying part, the connecting portion can be given a bend, so that its total height is reduced and adapted. Alternatively, for a heating conductor guide with a conical contour, the slots run in such a way that the perpendicular line from the slots to the heating conductor is substantially identical along the slots.

Whereas taps have at least been in two parts to the extent that lugs belonging thereto were needed for fixing to the carrying part, according to the invention the tap is constructed entirely in one piece manner.

BRIEF DESCRIPTION OF THE DRAWINGS

Further advantages and features of the invention can be gathered from the claims and following description of an embodiment of a heater relative to the drawings, wherein:

DETAILED DESCRIPTION

The inventive heater 1 has a carrying part 2, 3 with axially interengaged carrying plates formed along the longitudinal axis thereof with partial slots open on one side, with the plates being made from insulating material, such as mica, particularly in the form of micanites. The carrying plates 3 thus form a carrying part 2 in the form of a carrying star. Teeth 4 are formed on the lateral edges of the carrying plates 3. Optionally a carrying plate 3 according to DE-OS No. 2,722,213 can be provided.

Figure 1:
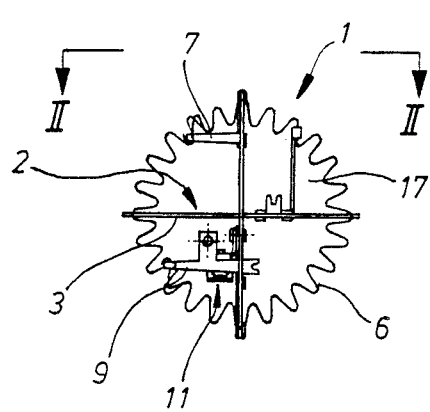
FIG. 1 is a schematic side view taken along the line I—I in FIG. 2.

A heating conductor 6 in the form of an insulating wire is wound round carrying part 2, being guided by the depressions of teeth 4 and are held therein. Between the edges of carrying plates 3, heating conductor 6 is substantially self-supporting, in that it is e.g. constructed in corrugated manner, as shown in FIG. 1. It is consequently stabilized in the area in which it is freely secured between the carrying plates 3.

Figure 2:
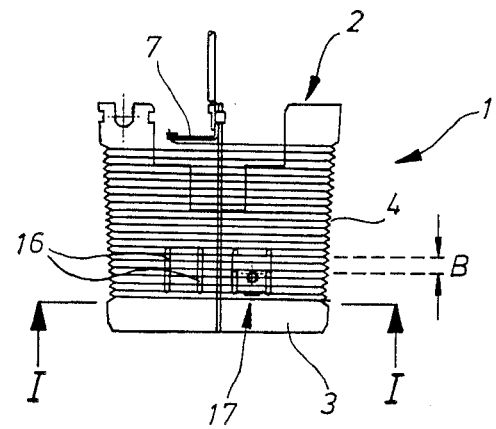
FIG. 2 is a plan view of a heat constructed in accordance with the present invention taken in the direction of the line II—II in FIG. 1.
Figure 3:
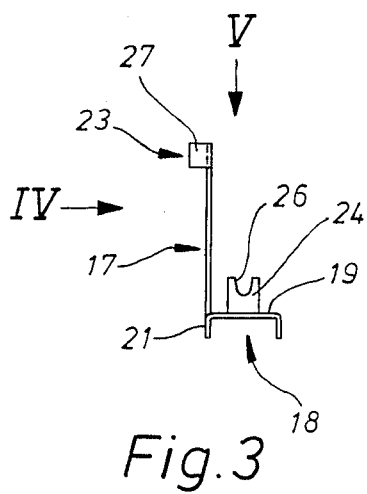
FIG. 3 is a detailed view of a single tap taken in the direction of the arrow III in FIGS. 4 and 5.

A connecting element 7 is engaged on one end of the heating conductor 6 by being pressed against the same. Connecting element 7 is fixed to carrying plate 3 and is provided with a connecting cable (FIG. 2). A corresponding connecting part 9 engages on the other end of the heating conductor, but is not directly connected to the connecting cable and instead this takes place via a temperature switch 11 provided with a bimetallic disk.

The thus constructed heaters generally serve as series resistors for operational elements of the appliance in which installation occurs, such a e.g. fan motors for warm air appliances, hair dryers. etc. Because the operational elements cannot be exposed to the full mains voltage available, which is e.g. applied to the heater and decreases across the same. It is therefore known to provide a voltage tap at intermediate points of the heating conductor and which is used for supplying the connection of an operational element, e.g. a motor.

In the represented embodiment the inventive heater has largely axially parallel slots 16, which receive and fix a voltage tap 17 in the manner described hereinafter. Tap 17 has in section a U-shaped foot part 18 with a U-web 19 and parallel fixing feet 21 extending to one side therefrom. A connecting portion 21 of tap 17 extends from foot part 18 in the opposite direction to the fixing feet 21 and aligned with one of these, whereby at the end remote from foot part 19 is constructed an in section U-shaped, open fixing sleeve 23. In foot part 19 is provided a connecting lug 24 with a cutting edge 26 for connecting a connecting cabe. Cutting edge 26 holds the connecting end of said cable, e.g. on soldering the same.

Figure 4:
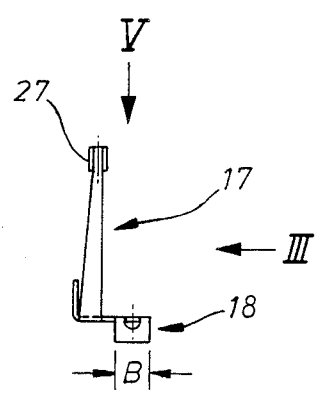
FIG. 4 is a schematic view taken in the direction of the arrow IV in FIGS. 3 and 5.
Figure 5:
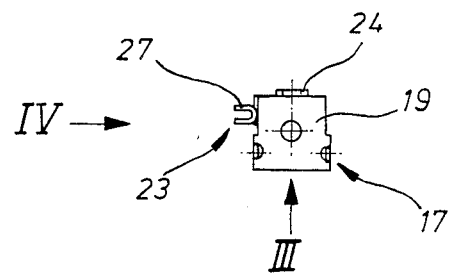
FIG. 5 is a view of a tap taken in the direction of the arrow V in FIGS. 3 and 4.

The spacing of feet 21 corresponds to the spacing of slots 16. The width B (FIG. 4) of feet 21 is less than the length of slots 16 and in the represented embodiment (FIG. 2) the width B of feet 21 is only roughly ⅓ of the length of slots 16, which with a total of about 22 turns extends over about 7 turns, i.e. a third of the number of turns. Tap 17 can consequently engage on about 4 turns, as a function of its position along slots 16.

The length of slots 16 preferably extends over a distance of about ¼ to ½ the total number of turns of a heater and the width of the feet 21 is also approximately 1/5 to ½ the total length of slots 16. This makes it possible to cover an adequate voltage range for the most varied use possibilities and operational elements, such as fan motors, particularly taking account of the choice of one of the two end connections 8 of the heater as a further connection of the operational element, besides the connection to tap 17.

After setting the desired tap position, the fixing of tap 17 takes place in that on the one hand the flaps 27 of tap sleeve 23 are pressed to heating conductor 6 and on the other hand the feet 21 engaging through slots 16 are bent down, so that they are secured thereto together with the foot web 19.

We claim:

1. Electric heater with at least one insulating carrying part and at least one heat conductor carried by the carrying part and with at least one tap for tapping a reduced voltage as compared with a voltage applied to the heating conductor, wherein the at least one carrying part has slots through which pass feet means of the at least one tap for fixing the at least one tap to the carrying part, and wherein a length of the slots is greater than a width of the feet means of the at least one tap.

2. Heater according to claim 1, where at least two feet means are provided and bent towards one another, and wherein said two feet means respectively pass through two parallel slots.

3. Heater according to one of claims 1 or 2, wherein the slots are arranged parallel to a longitudinal axis of the electric heater.

4. Heater according to one of claims 1 or 2, wherein the heating conductor has a conical contour, the slots are directed in such a way that a perpendicular line from the slots to the heating conductor is substantially identical along the slots.

5. Heater according to one of claims 1 or 2, wherein the tap is completely in one piece.

6. Heater according to one of claims 1 or 2, wherein the length of the slots is a multiple of a spacing of adjacent turns of the heating conductor.

7. Heater according to one of claims 1 or 2, wherein there slots extend over the one-sixth to one-third of a length of the carrying part.

8. Heater according to one of claims 1 or 2, wherein a width of the feet means of tap passing through slots is a fraction of the length of the slots in an extension direction of the slots.

9. Heater according to one of claims 1 or 2, wherein the slots extend substantially at right angles to a running direction of individual turns of the heating conductor.

* * * * *